US006583407B1

(12) United States Patent
Fischer et al.

(10) Patent No.: US 6,583,407 B1
(45) Date of Patent: Jun. 24, 2003

(54) METHOD AND APPARATUS FOR SELECTIVE ION DELIVERY USING ION POLARITY INDEPENDENT CONTROL

(75) Inventors: Steven M. Fischer, Hayward, CA (US); Charles W. Russ, IV, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 77 days.

(21) Appl. No.: 09/645,050

(22) Filed: Aug. 23, 2000

Related U.S. Application Data

(63) Continuation-in-part of application No. 09/429,063, filed on Oct. 29, 1999.

(51) Int. Cl.[7] .......................... B01D 59/44; H01J 49/00

(52) U.S. Cl. ....................... 250/288; 250/281; 250/287; 250/282

(58) Field of Search ................................ 250/288, 281, 250/290, 291, 292, 293, 282, 283, 287

(56) References Cited

U.S. PATENT DOCUMENTS 4,542,293 A * 9/1985 Fenn et al. ................. 250/288
4,977,785 A * 12/1990 Willoughby et al. ..... 73/863.12
5,519,215 A * 5/1996 Anderson et al. ........... 250/288
5,523,566 A * 6/1996 Fuerstenau et al. ......... 250/282
5,572,035 A * 11/1996 Franzen .................. 250/396 R
5,672,868 A * 9/1997 Mordehai et al. ........... 250/281
5,726,447 A 3/1998 Aisawa et al. .............. 250/288
5,736,741 A 4/1998 Bertsch et al. .............. 250/288
5,838,003 A 11/1998 Bertsch et al. .......... 250/288 A
5,877,495 A * 3/1999 Takada et al. .............. 250/288
5,936,242 A 8/1999 De La Mora et al. ...... 250/288
6,060,705 A * 5/2000 Whitehouse et al. ....... 250/288

* cited by examiner

*Primary Examiner*—John R. Lee
*Assistant Examiner*—K Fernandez
(74) *Attorney, Agent, or Firm*—Timothy H. Joyce

(57) ABSTRACT

The present invention relates to a method for selectively delivering ions to a mass analyzer operating in a vacuum region. The method involves providing a dielectric conduit having an axial bore originating in an inlet opening that communicates with an ion source and terminating in an exit opening disposed within the vacuum region. A gas stream comprising an ion having a polarity and traveling at a drift velocity is flowed through the bore from the inlet opening toward the exit opening. A motion component is altered in a manner that does not substantially depend on the polarity of the ion to effect a change in the drift velocity of the ion. The invention also provides an apparatus to carry out the method.

30 Claims, 4 Drawing Sheets

METHOD AND APPARATUS FOR SELECTIVE ION DELIVERY USING ION POLARITY INDEPENDENT CONTROL

CROSS REFERENCE TO RELATED APPLICATIONS

This application is a continuation-in-part of U.S. application Ser. No. 09/429,063 filed Oct. 29, 1999, from which application priority is claimed under 35 U.S.C. §120, and which disclosure is hereby incorporated by reference in its entirety.

TECHNICAL FIELD

This invention relates generally to mass spectrometry and particularly to use of a dielectric conduit in combination with means for altering the motion of an ion to effect selective ion delivery to a mass analyzer.

BACKGROUND

Mass spectrometers have been shown to be particularly useful for analysis of liquid or gaseous samples, and have been coupled with gas chromatographs in gas chromatography ("GC") or liquid chromatographs in liquid chromatography ("LC"), for analysis of substances having a wide range of properties. Considerable interest has developed in the pharmaceutical and medical diagnostic industries in employing mass spectrometers to analyze batch samples that contain defined analytes. Typically, the sources of the samples are biological fluids or crude extracts that contain significant interfering components to analysis. Therefore, sample treatment for removal of these confounding components constitutes a significant proportion of the cost of analysis. Efforts, therefore, have been directed toward reducing the extent of sample treatment prior to introduction into a mass spectrometer. For instance, tandem mass spectrometry ("MS/MS") has been used to reduce the need for sample preparation during a simple target compound analysis. However, MS/MS systems are significantly more expensive than single MS systems. Therefore, it would be desirable to provide a method and/or apparatus that allows for inexpensive mass filtration in a MS system yet allows for improved and efficient analysis of specific target compounds.

Mass spectrometers operate by ionizing a sample and directing the ionized sample to a mass analyzer. There are many methods by which a sample may be ionized. For example, mass spectrometers employing atmospheric pressure ionization ("API") techniques can be particularly useful for obtaining mass spectra from liquid samples, and MS systems employing such ion sources are frequently used in conjunction with high performance liquid chromatography ("HPLC"). Combined HPLC/MS systems are commonly used for analysis of polar and ionic substances, including biomolecular species. In API techniques, a liquid sample containing a mobile phase (e.g., solvent) and analytes is introduced into an ionization chamber and there converted to a charged dispersion or aerosol of fine droplets from which ions emerge as the liquid evaporates and the droplets shrink in size. The conversion of liquid to spray or aerosol can be accomplished by any of a variety of techniques. Evaporation of the liquid can be assisted, for example, by passing a flow of warm gas ("drying gas") through the cloud of droplets.

In mass spectrometers, an interface may be provided between the ion source and the mass analyzer. In the API technique, a liquid sample is introduced into an ionization chamber that is at a relatively high pressure, e.g., at or near atmospheric pressure. Once ionized, the sample is conveyed through the interface to the mass analyzer. Typically, the mass analyzer is disposed in an enclosure at high vacuum or a very low pressure. A conduit having a lengthwise bore there through may serve as the interface for the ions. One end of the conduit opens into the ionization chamber, and the other end of the conduit opens into the enclosure containing the mass analyzer. As a result, a gas stream flows through the bore of the conduit from the ionization chamber to the enclosure containing the mass analyzer.

Various mass spectrometers employing a conduit interface between an API ion source and the mass analyzer have been described, for example, in U.S. Pat. No. 5,838,003 to Bertsch et al. relating to electrospray ionization ("ESI"), and U.S. Pat. No. 5,736,741 to Bertsch et al. relating to ESI and atmospheric pressure chemical ionization ("APCI"), U.S. Pat. No. 5,726,447 to Aisawa et al. relating to corona discharge ionization. None of these techniques and interfaces provides for mass selectivity or separation of components in a complex matrix.

Dielectric conduits are a means for providing direction and guidance of gas flow. Mass spectrometers often employ dielectric conduits in combination with electrodes disposed at each end of the conduit, wherein the electrodes are connected to a source of electrical potential. See, for example, U.S. Pat. No. 4,542,293 to Fenn et al. In conventional operation of such an apparatus, the electrode at the upstream end of the capillary, i.e., the end in the ion source, is held at a high electrical potential (typically in the range −3000 V to −5000 V for operation in a "positive ion" mode; the polarity is reversed for operation in a "negative ion" mode). The electrode at the downstream end of the capillary, i.e., the end in the vacuum chamber containing the mass analyzer, is held at a lower and oppositely charged electrical potential (typically in the range +50 V to +400 V for operation in a "positive ion" mode). As the gas stream flows through the bore of the conduit, the gas stream tends to entrain and carry ions generated in the ion source toward the mass analyzer. However, the opposing electric field generated by the electrodes hinders ion movement toward the mass analyzer. In conventional use of the conduit, the effect of the gas flow dominates over that of the opposing electric field, and the ion is moved from the entrance toward the exit of the conduit.

Techniques have been proposed for separating ions according to their mobility by a combination of gas flow and electric field. In ion mobility spectrometry ("IMS"), an accelerating electrical potential is employed to move ions with a drift velocity through a gas, in some cases against a counter current gas flow. In IMS, ions having higher mobility have higher drift velocities. In one approach as described in U.S. Pat. No. 5,936,242 to De La Mora et al., a laminar gas flow is established along an axis within an analytical chamber and an electric field is applied along a transverse axis to separate ions in a complex mixture according to their mobility. Although this technique provides separation of ions according to mobility, it provides no further analysis of the ions.

There is a need for a method and apparatus of mass selection that takes advantage of using a dielectric conduit and which does not suffer from the inherent limitation of being dependent on the polarity of the analyte ion. The invention addresses this need.

OBJECTS AND SUMMARY OF THE INVENTION

Accordingly, it is an object of the present invention to overcome the above-mentioned limitations of the prior art by providing a new and effective method for selectively delivering ions to a mass analyzer operating in a vacuum region through a dielectric conduit. Selective delivery of an ion is effected by altering the motion of the ion in a manner that does not substantially depend on the polarity of the ion.

It is still another object of the invention to provide such an apparatus that comprises a dielectric conduit and a velocity altering means for altering the velocity of the ion in the conduit in a manner that does not substantially depend on the polarity of the ion.

It is a further object of the invention to provide such an apparatus wherein the velocity altering means involves a gas temperature change or ion trapping in an alternating electric field.

Additional objects, advantages and novel features of the invention will be set forth in part in the description which follows, and in part will become apparent to those skilled in the art upon examination, or may be learned by practice of the invention.

Accordingly, in one general aspect, the invention features a method for selectively delivering ions to a mass analyzer operating in a vacuum region. In this method, a dielectric conduit is provided having an axial bore originating in an inlet opening in communication with an ion source and terminating in an exit opening within the vacuum region. An ion of either positive or negative polarity is entrained by a gas stream and exhibits a drift velocity through the conduit from the inlet opening toward the exit opening. The drift velocity comprises a component that is determined by the gas flow velocity and an opposing component produced, e.g., by action of an applied electric field. While the ion is in the axial bore, the opposing velocity component of the ion is altered in a manner that does not substantially depend upon the polarity of the ion to effect a change in the drift velocity of the ion. Depending on the effective collision cross section of the ion, the change in the drift velocity may result either in contact between the ion and the dielectric conduit or in the ion exiting the dielectric conduit through the exit opening. By altering the resultant drift velocity of an ion by changing its mobility, the overall composition of the ions that reach the mass analyzer can be altered.

In another general aspect, the invention features an apparatus for selectively delivering ions from an ion source to a vacuum region of a mass analyzer. A dielectric conduit is provided having an axial bore originating in an inlet opening that communicates with the ion source and terminating in an exit opening disposed in the vacuum region, wherein the gas flows from the ion source to the vacuum region at a drift velocity. In addition, the apparatus also includes a velocity altering means for altering a velocity component of the ion in a manner that does not substantially depend on the polarity of the ion to effect a change in drift velocity of the ion within the dielectric conduit.

BRIEF DESCRIPTION OF THE FIGURES

The invention is described in detail below with reference to the following figures.

DETAILED DESCRIPTION OF THE INVENTION

Overview and Definitions

Figure 1A:
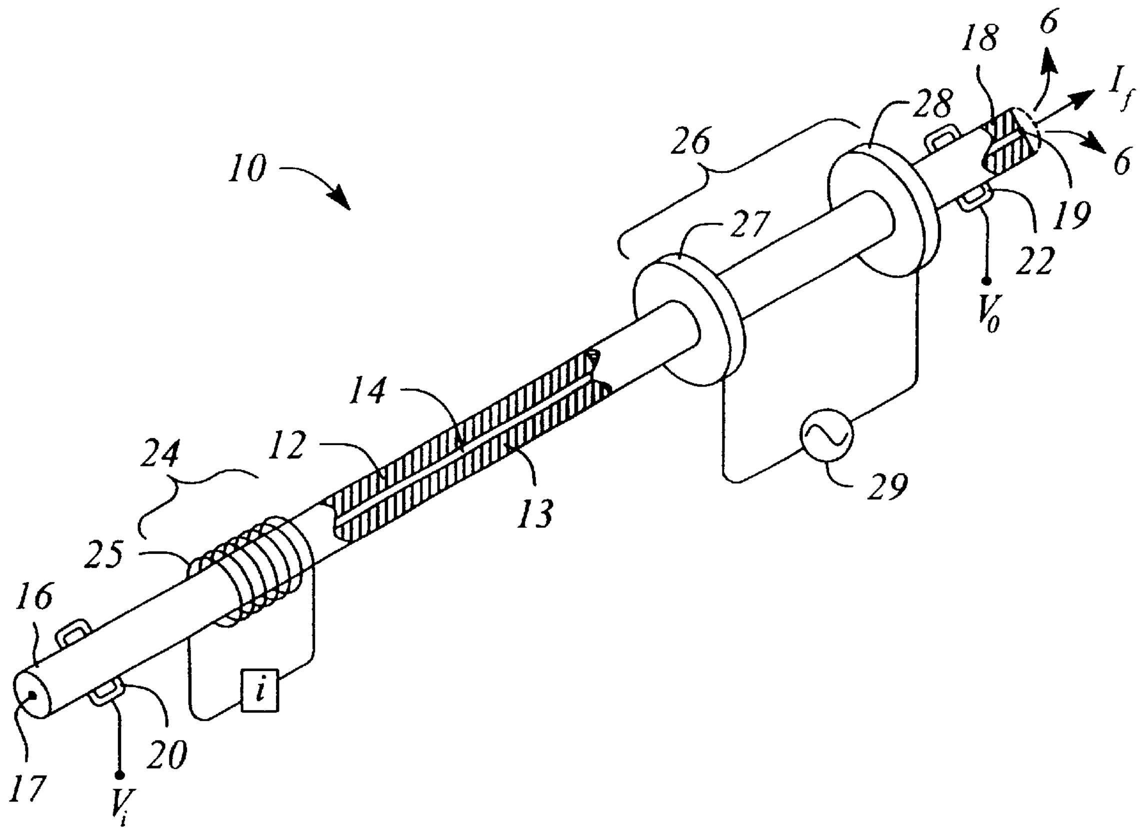
FIG. 1A illustrates in sectional view a dielectric conduit of the invention in combination with two velocity altering means.

Before describing the present invention in detail, it is to be understood that this invention is not limited to specific compositions, gases, process steps, or equipment, as such may vary. It is also to be understood that the terminology used herein is for the purpose of describing particular embodiments only, and is not intended to be limiting.

It must be noted that, as used in this specification and the appended claims, the singular forms "a", "an" and "the" include plural referents unless the context clearly dictates otherwise. Thus, for example, reference to "an ion" includes more than one ion, reference to "a wavelength" includes a plurality of wavelengths and the like.

In describing and claiming the present invention, the following terminology will be used in accordance with the definitions set out below.

The term "ion source" is used herein to refer to any device that can deliver ions to the conduit of the invention. In the following, use of an atmospheric pressure ionization chamber is described and is one embodiment of an ion source. A person of skill in the art will easily recognize that there are many other ion source embodiments to which the invention can be applied.

The term "capillary" is used herein to refer to a conduit having a bore of very small dimension. Typically, capillaries of the present invention have bore diameter in the range of about 0.1 to about 3 mm, preferably about 0.2 to about 1 mm, and length greater than about 10 times the diameter of the bore, preferably about 180 mm. The preferred range of capillary (conduit) lengths for the invention is about 20 to about 300 mm, although lengths outside that range will work.

The term "dielectric" and the term "insulator" are used herein interchangeably and refer to a material that does not substantially conduct electric current. Typical dielectric materials exhibit electrical resistivities greater than $10^5$ and more preferably greater than about $10^6$ ohm-cm. The term "dielectric conduit" refers to a member that includes a tube constructed of a dielectric material, but does not necessarily exclude tubes that are made in part with an electrically conductive material.

The term "drift velocity" is used herein to refer to the mean ion velocity within the conduit in a direction from within the inlet opening to the exit opening. The ion drift velocity is the resultant of two motion components: the ion motion component caused by gas flow from inlet opening to exit opening, and the opposing motion component caused by the force on the ion due to the electric field, said force being directed from the exit opening toward the entrance opening. The component of drift velocity caused by the gas flow results from collisions of the ions with the flowing gas molecules and will be about equal to the gas velocity under typical conditions of temperature, pressure and gas composition. Such conditions could be a temperature of 150° C., atmospheric pressure and gas composed of mostly $N_2$ with small amounts of solvent ions and molecules, analyte molecules and analyte ions. The component of the drift velocity due to the electric field is proportional to the magnitude of the field and the factor of proportionality is the mobility. An ion with higher mass generally has a lower mobility than does an ion with low mass. Such a higher mass ion will then have a lower component of velocity due to the field than will the lower mass ion. Thus, according to the invention, an ion with a high mobility tends to have low drift velocity with a field applied; an ion with a low mobility tends to have a high drift velocity with the same field.

The term "ion" is used in its conventional sense to refer to a charged atom or molecule, i.e., an atom or molecule that contains an unequal number of protons and electrons. Positive ions contain more protons than electrons, and negative ions contain more electrons than protons. An ion of the present invention can be singly charged, or it may have a multiple charge.

The term "polarity" as used herein to describe an ion refers to the particular electrical state of the ion's charge and can only be either positive or negative, but not both simultaneously. According to the invention, a velocity component of an ion can be altered in a manner that does not "substantially depend" on the ion's polarity. An alternating electric field is an example of an energizing means that alters the overall motion of an ion in a manner that does not "substantially depend" on the ion's polarity, although the detailed path of motion can depend on the phase of the field with respect to the polarity. A static electric field, on the other hand, determines the velocity of the ion in a manner that substantially depends on the ion's polarity, but that velocity can then be changed by a polarity-independent means according to the invention.

The term "radio frequency" is used herein in its conventional sense to refer to wave frequencies less than about $1\times10^9$ Hz, and in this invention, typically about 10 kHz to about 10 MHz.

The present invention is directed to a method for selectively delivering ions to a mass analyzer operating in a vacuum region. The method involves providing a dielectric conduit having an axial bore and flowing a gas stream comprising an ion having either a positive or a negative polarity through the conduit toward a mass analyzer. The dielectric conduit has electrodes disposed at each of its ends, and the electrodes are connected to a source of electrical potential difference. The electrode at the upstream end of the capillary, i.e., the end in the ionization chamber, is held at a high electrical potential (typically in the range −3000 V to −5000 V for operation in a "positive ion" mode; the polarity is reversed for operation in a "negative ion" mode). The electrode at the downstream end of the capillary, i.e., at the end in the vacuum chamber containing the mass analyzer, is held at a lower and oppositely charged electrical potential (typically in the range +50 V to +400 V for operation in a "positive ion" mode). As the gas stream flows through the bore of the conduit, the gas stream tends to entrain and carry ions generated in the ionization chamber toward the mass analyzer. However, the opposing electrical field generated by the electrodes hinders ion movement toward the mass analyzer. Because the gas stream acts differently upon ions having different masses, the combination of the gas flow and the opposing electric field tends to separate ions having different masses. While the ion is in the axial bore, the motion of the ion is altered to effect a change in the drift velocity of the ion within the dielectric conduit. Unlike other methods for selectively delivering ions to a mass analyzer, the velocity of the ion is altered in a manner that does not substantially depend on the polarity of the ion. Depending on the mobility and effective collision cross section of the ion, the ion either contacts the dielectric conduit or exits the dielectric conduit through the exit opening. In this way, the overall composition of the ions that reach the mass analyzer can be adjusted. In addition, the invention is also directed to an apparatus for selectively delivering ions to a mass analyzer.

The invention is described herein with reference to the figures, in which like parts are referenced by like numerals. The figures are not to scale, and in particular, certain dimensions may be exaggerated for clarity of presentation.

Referring to the figures, FIG. 1A shows a detailed drawing of a dielectric conduit 10 of the invention. An axial bore 14, located within the conduit, is defined by conduit walls 12 and 13 and terminates at the ends of the conduit. An inlet opening 17 is disposed at an inlet end 16 of the conduit, and an exit opening 19 is disposed at the exit end 18 of the conduit. Typically, inlet end electrode 20 is associated with the inlet end, and exit end electrode 22 is associated with the exit end 18. While the invention does not require two velocity altering means, FIG. 1A illustrates two velocity altering means 24, 26 each associated with the conduit at a region along the conduit length between the inlet end and the outlet end. Velocity altering means 24 is disposed closer to the inlet end while velocity altering means 26 is disposed closer to the exit end. These velocity altering means are discussed in detail below.

Figure 2:
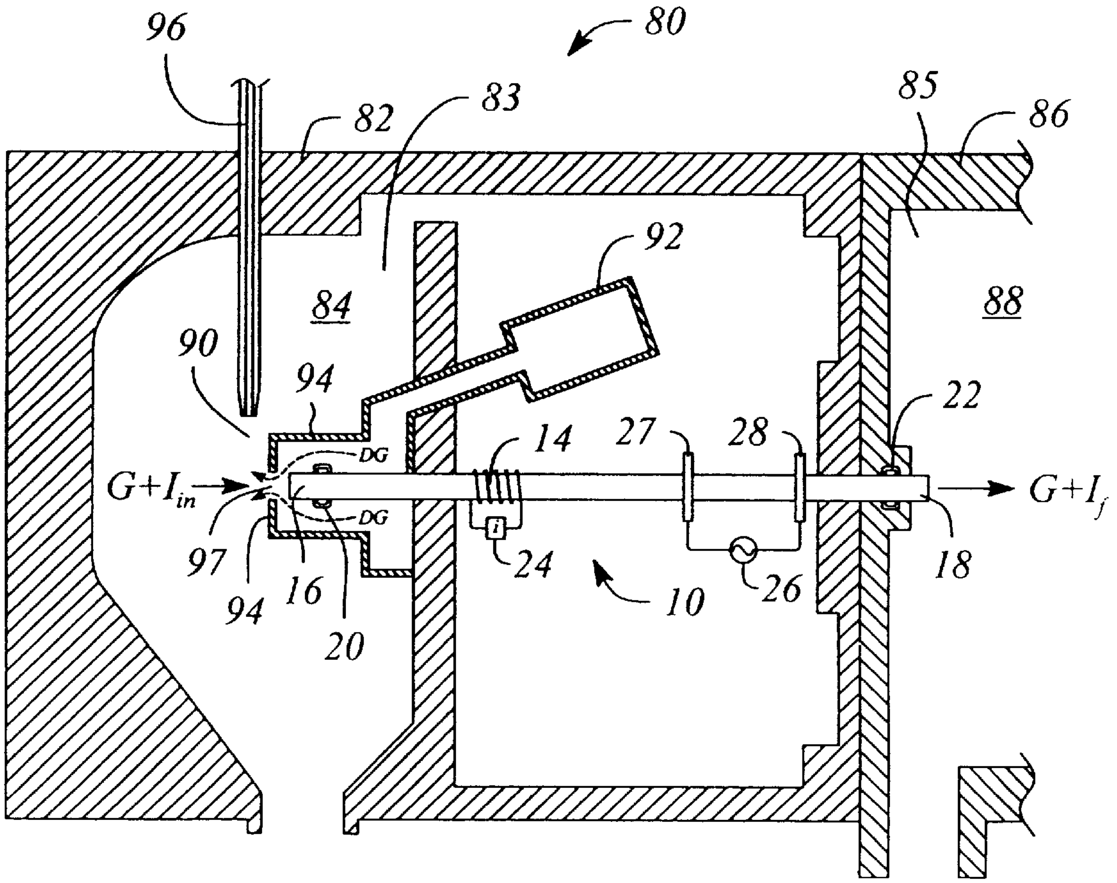
FIG. 2 schematically illustrates in a sectional view of an ion source employing the dielectric conduit of FIG. 1A.
Figure 4:
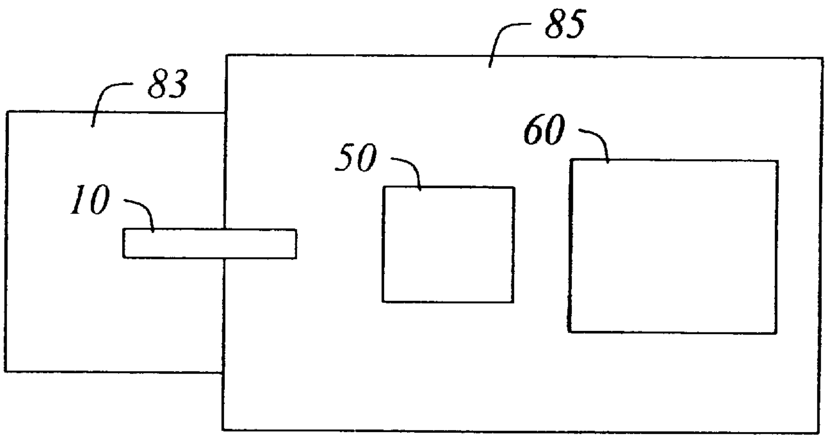
FIG. 4 schematically illustrates the dielectric conduit of the invention with a mass analyzer and optional ion optical system.
Figure 5:
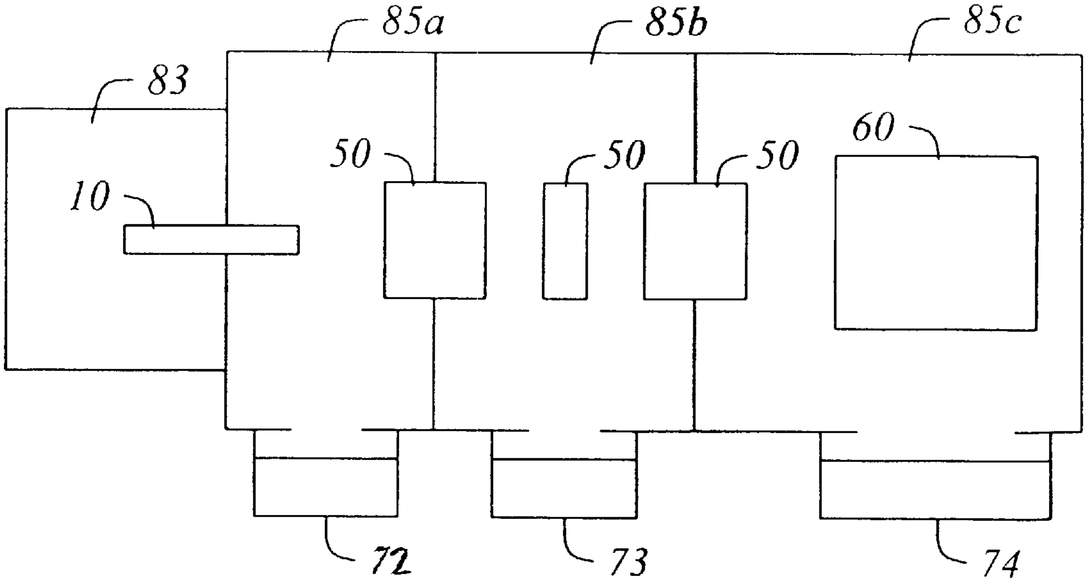
FIG. 5 schematically illustrates use of the invention with a multi-chamber vacuum system, mass analyzer and optional ion optical system.

FIG. 2 shows, by way of example, an embodiment of the invention in the form of API ion source apparatus 80 for a mass spectrometer. The apparatus 80 includes walls (e.g., 82) defining an ion source 83 in which the enclosed volume 84 is at higher pressure, typically about atmospheric pressure, when the apparatus is in operation; and walls (e.g., 86) defining a vacuum chamber 85 (shown in part) in which the enclosed volume 88 is at reduced pressure, typically in the range of approximately 10 torr to $10^{-8}$ torr. In some mass spectrometer configurations, the vacuum chamber 85 may contain elements such as, for example, a mass analyzer, that function at very high vacuum. FIG. 4 schematically illustrates a standard mass analyzer 60 disposed in vacuum chamber 85 with optional ion optics system 50. The ion optics system 50 may comprise lenses and/or ion guides for assisting the transport and delivery of ions exiting conduit 10 to mass analyzer 60. In other configurations, the vacuum chamber 85 may comprise one or more stages between the ion source and mass analyzer and may contain, for example, ion optical elements or ion guides which operate under vacuum, but not at the high vacuum characteristic of the operation of a mass analyzer. FIG. 5 schematically illustrates a multi-stage embodiment of the invention, incorporating vacuum chambers 85*a*, 85*b*, 85*c* separately pumped by vacuum pumps 72, 73 and 74, respectively.

FIG. 2 also shows the dielectric conduit 10 as in FIG. 1A installed in ion source apparatus 80 as an interface between the ion source 83 and the vacuum chamber 85. The inlet end 16 with associated electrode 20 is located in ion source 83 downstream from ionization region 90, and the exit end 18 with associated electrode 22 is located in vacuum chamber 85. A source 92 of drying gas provides a flow of heated gas to an enclosure formed by a cowl 94, which directs the drying gas generally upstream (arrows DG) through an opening 97 toward the ionization region 90, where it passes through the cloud of droplets formed by the electrospray assembly 96. The temperature of the drying gas can be changed according to the sample. The cowl may be connected to a source of electrical potential, and may be employed to generate and to shape an electric field within the ion source.

Figure 1B:
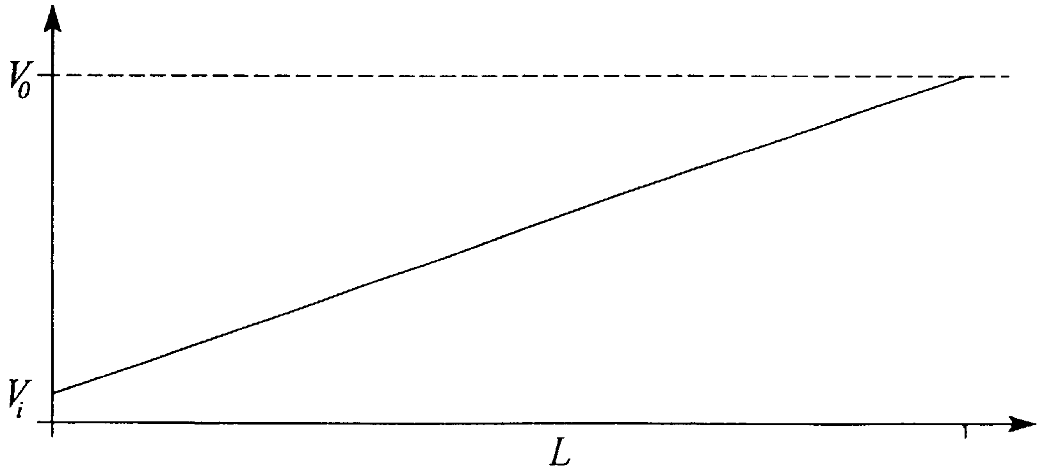
FIG. 1B is a diagram of an idealized electric potential gradient over the length of the conduit in FIG. 1A in operation without generating an alternating electric field.

Referring to the arrows of FIG. 2, gas (including vapor) together with ions formed in the ionization region 90 flows from the higher-pressure volume 84 into the inlet opening in the inlet end 16 of the capillary. Arrow G indicates a flow of gas into the inlet opening wherein the gas entrains a population of ions $I_{in}$. In conventional operation, ions entrained in the gas flow within the bore of the capillary are carried toward the lower-pressure volume 88, and emerge from the exit opening in the exit end 18 of the capillary into the downstream vacuum chamber 85. However, an electric potential is typically applied to each of the inlet and exit end electrodes 20, 22 to produce an opposing voltage gradient corresponding to the polarity of the ions flowing through the capillary. FIG. 1B is a diagram of an idealized gradient of the electrical potential (P) over the length (L) by application of electrical potentials at the electrodes. The voltages are set so that the voltage gradient is sufficiently steep to cause an ion having a low drift velocity to stall within the capillary bore, and to drift to the walls of the capillary. As a result, the subpopulation $I_f$ of ions emerging in the gas flow from the capillary exit ($G+I_f$ in FIG. 2) and entering the free jet expansion in the vacuum chamber has a higher proportion of ions having higher drift velocities than were present in the population $I_{in}$ that had flowed into the capillary inlet.

FIG. 1B shows a plot of the absolute potential P versus distance L along the conduit. In the diagram, $V_i$ is the voltage at the inlet end and $V_o$ is the voltage at the exit end. For operation in positive ion mode, for example, the input end voltage $V_i$ is electronegative as compared with the exit end voltage $V_o$. For operation in negative ion mode, for example, the input end voltage $V_i$ is electropositive as compared with the exit end voltage $V_o$. With proper design, $V_i$ and $V_o$ can be selected to provide a linear voltage gradient from the input electrode that is sufficiently steep to retard the passage of ions having lower drift velocities. In some embodiments, the end-to-end potential difference (absolute value) is in the range approximately 500 V to 8 kV, preferably 500 V to 5 kV.

The drift velocities of ions passing through the conduit depend upon the gas flow velocity and the applied electric field. As shown in FIG. 1A, velocity altering means 24, 26 are associated with the conduit at a region along the conduit length between the inlet end and the outlet end. The velocity altering means may be designed to alter the velocity of an ion at a specific portion of the conduit or over the entire conduit length. In operation, the velocity altering means 24, 26 alter the velocity of ions traveling through the bore in a manner that does not substantially depend on the polarity of the ion. Those means effect a change in drift velocity of the ion within the dielectric conduit such that the ion takes an alternative path within the dielectric conduit. Alternative paths include those that result in contact between the ion and the dielectric conduit and those that result in the ion exiting the dielectric conduit through the exit opening. When the ion contacts the dielectric conduit, the ion tends to be effectively neutralized and adheres to the bore wall.

In one embodiment of the invention a thermal velocity altering means 24 is employed that can change the ion drift velocity in a manner that does not substantially depend on the polarity of the ion. Temperature alteration results in a change in the density of the gas stream traveling through the bore of the conduit. For example, raising the temperature of the gas in the conduit lowers overall gas density, which in turn increases the mobility of the ions. Conversely, lowering the temperature of the gas in the conduit increases overall gas density, which in turn decreases the mobility of the ions. By changing the mobility of the ions, the overall mass distribution of the ions within the conduit is also changed. Accordingly, the mass distribution of ions that reach the mass analyzer is also altered. In other words, heating the gas stream flowing through the dielectric conduit tends to decrease the number of ions with low mass that reach the mass detector. Removing heat from the gas stream flowing through the conduit tends to increase the number of ions with low mass that reach the mass detector.

It is apparent that the gas stream temperature can be altered by heating or cooling the gas in the ion source before it flows into the conduit. Since contact between ions and the conduit wall tends to result in removal of the ion from the gas stream, thermal energy transfer is not readily effected through direct conduction from the conduit to the ion. However, thermal transfer may nevertheless be effected by heating or cooling the conduit. Once the conduit is heated, non-ionic components of the gas stream such as an inert carrier gas can provide an intermediary medium for heat transfer purposes such that the temperature of the ion can be changed by interaction with the inert gas, which in turn contacts the wall of the bore. Depending on the dimensions of the conduit, the beneficial effects of conduit heating may be observed by changing the temperature of the tube by as little as 50° C. In addition, it will be evident to one of ordinary skill in the art that the change in conduit temperature may be selected to provide optimal mass composition of the ions entrained in the gaseous stream that ultimately exits the conduit. Accordingly, a controller may be provided to allow an operator to selectively adjust the composition of the ions for a particular ionized sample. One way to lower the temperature of the conduit is through conduction by placing a thermally conductive jacket having channels therein around the conduit and flowing a fluid of a particular temperature through the channels to effect heat transfer, e.g., when the fluid temperature is lower than the temperature of the conduit, the conduit is chilled. One way to increase the temperature of the conduit is to wrap an electrically conductive element 25 around the conduit and pass electrical current through the element as shown in FIG. 1A. There are many other means for heating or cooling a conduit that are known to one of ordinary skill in the art, and such means may be employed singly or in combination depending on the extent of temperature control that is required or desired. The gas itself can be heated or cooled by portions of the ion source or ionization chamber or by heating or cooling the drying gas by conventional means.

Another means for altering the drift velocity of an ion entrained in the gas stream involves heating the gas stream through application of radiative electromagnetic energy. Heating can be achieved by directly subjecting the ion to electromagnetic radiation having a wavelength that can be absorbed by the gas stream or the ion to raise the temperature of the ion. Such heating involves a source of electromagnetic radiation and a conduit that is at least partially transparent to the wavelength of the radiation. The wavelength is generally chosen depending on the composition of the gas stream. Preferred radiation wavelengths for heating include infrared and microwave wavelengths. Radiative heating does not preclude ion temperature change by heating or cooling the conduit.

In a second embodiment of the invention, an electric velocity altering means 26 may be used that can change the ion drift velocity in a manner that does not substantially depend on the polarity of the ion. This can be done by generating an alternating direction electric field having a frequency and an amplitude to effect ion trapping within the conduit. The trapping electric field can be generated by electric velocity altering means 26 as shown in FIG. 1A. Means for generating the field may comprise, for example, two alternating voltage electrodes 27, 28 each encircling the conduit. An AC power supply 29 is connected with each of the two electrodes. The AC power supply 29 is designed to generate an electric field having an alternating direction. The frequency may be a radio frequency. In addition, the AC power supply may be designed to provide a range of electric frequencies and/or amplitudes, and may alternatively be adapted to provide pulses or other nonsinusoidal waveforms of alternating polarity. The electrodes may be permanently affixed at a specified distance apart from each other or adjustably disposed such that the distance can be variably or controllably set for any particular sample.

In essence, the electric velocity altering means 26 can filter ions in the dielectric conduit 10 by providing ion trapping in pseudo-potential wells between the alternating voltage electrodes 27,28. These alternating voltage electrodes serve as ring lenses in effecting ion trapping. In combination, ion velocity, ion mass, electric field frequency, electric field amplitude, and electrode spacing, affect the ion trapping performance. As described above, ions of various masses and mobility are entrained in the gas stream flowing through the dielectric conduit 10. Generally, an ion with higher mobility, i.e., one with a lower mass, will have a lower drift velocity because the gas is assisting ions through the capillary against the electric field generated by the inlet and exit end electrodes. When an alternating direction electric field of appropriate frequency and magnitude is generated by the alternating voltage electrodes, ions with low drift velocity are trapped therebetween. When stopped in the capillary, an ion will drift to the walls of the capillary where it is captured and effectively neutralized. It is important to note that the electric velocity altering means may include more than two electrodes. In addition, either the inlet or the exit end electrode can serve as an electrode of the electric velocity altering means. It is also important to note that this method of altering the ion drift velocity does not require the use of an electric field applied between the ends of the conduit for producing force on the ion to oppose the gas flow. Consequently, the length of the conduit can be much greater, up to about 5 meters, if needed for achieving desired pressure drops.

The useful spacing of the electrodes is limited by the conduit diameter. It is preferred that the electrode spacing be about 4 times the conduit diameter, but the invention will function well with other spacings. The optimum frequency and magnitude of the alternating voltage applied to the electrodes will depend upon the gas density as well as the spacing and the conduit diameter. Optimum values of these parameters for particular apparatus are determined experimentally, as can easily be done by those of ordinary skill in the art without undue experimentation. The range of effective frequencies is usually between about 50 kHz and about 500 kHz, and the resulting voltage magnitude range is expected to be about 20 to about 1000 V.

Accordingly, a velocity altering means such as 24 or 26 may alter the velocity of an ion by introducing (or removing) heat or by applying an alternating electric field. Each velocity altering means may be employed by itself, with another velocity altering means of the same type, or with another velocity altering means of a different type. In addition, different velocity altering means may be employed in series or in parallel. For example, an electric field generating means may be employed to generate an alternating electric field along a section of the dielectric conduit that is simultaneously heated. Alternatively, heat may be applied to the inlet end of the dielectric conduit while an alternating electric field is generated at the exit end. Such combinations may be used to simultaneously control the composition of the ions that exit the dielectric capillary. Selection of particular velocity altering means or combinations thereof to optimize performance is within the capability of one of ordinary skill in the art.

The conduit of the invention may be fabricated from a number of materials, in a variety of ways. The dielectric conduit can be constructed of materials such as borosilicate glass, quartz, ceramic, or plastics such as polytetrafluoroethylene ("PTFE", Teflon®) or polyimide, e.g., Vespel®. The electrodes can be constructed as fittings or as coatings of an electrically conductive material, or as a combination of coatings and fittings. The electrically conductive material can be a relatively nonreactive, electrically conductive metal such as, for example, chiromium, silver, gold or platinum. Where a fitting is used, the fitting may be, for example, a metal cap or sleeve configured to slip over the conduit, or a metallized cap or sleeve constructed of a nonconductive material which may conveniently be deformable (such as a elastic or resilient material) to provide for a secure fit into the conduit. Where a coating is used, it may be preferable to employ two or more electrically conductive coatings, a first one of which has characteristics of good adherence to the surface of the dielectric material, and an additional one of which has desirable mechanical and other properties not provided by the first-applied electrically conductive material. And, where a coating is used, it can be applied, for example, by conventional sputter coating or vapor coating, by electrodeless plating, or by a conventional chemical deposition technique, using, for example, ceramic paint or a metal paint such as a gold paint or silver paint, or, a metal-containing compound such as chromium hexacarbonate in an organic solvent such as chloroform.

As described above, the velocity altering means causes ions having drift velocities below a lower limit to stall out of the gas flow in the bore of the conduit and to impact the bore wall of the conduit. Ordinarily, their electrical charge gradually dissipates. Where the quantity of ions impacting the conduit wall is high, the dielectric material of the conduit may be unable to carry the charge away rapidly enough, and undesirable charging effects may result. End-charging within the bore of the conduit can be reduced by providing that the bore surface of an end portion of the conduit be of an electrically conductive material that carries away electrical charge resulting from ion collisions with the bore surface.

Figure 3:
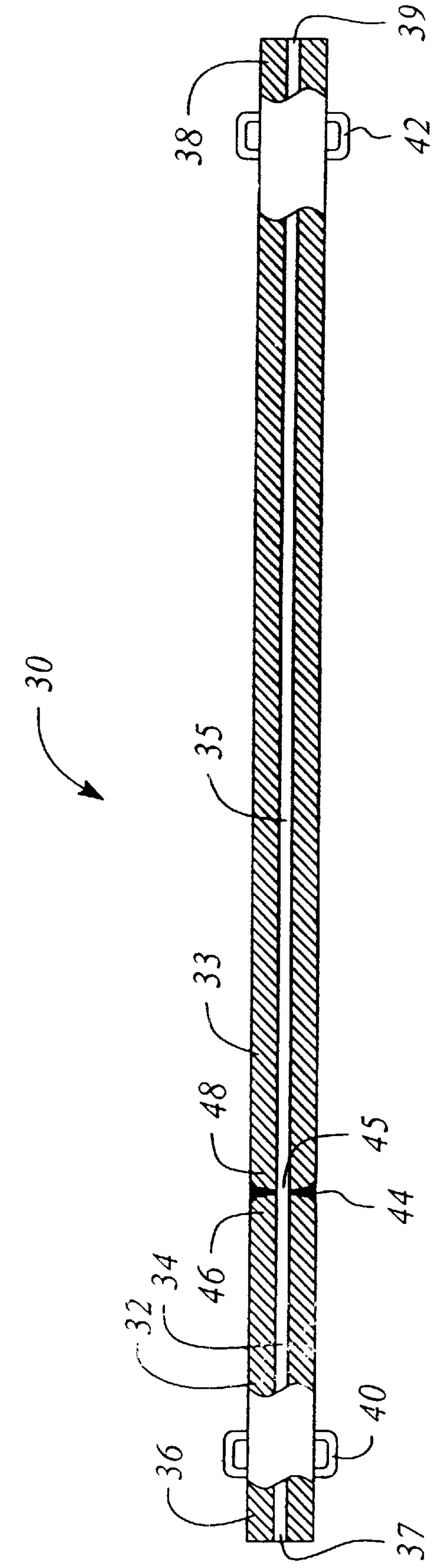
FIG. 3 schematically illustrates a conduit of the present invention with a conductive coating disposed on the interior surface of the conduit bore.

Similarly, undesirable charging effects resulting from impact of stalled ions within the conduit according to the present invention can be reduced by providing an electrically conductive surface within the bore of the conduit in regions along the conduit length where collision of stalled ions may be expected to result, and providing for electrical connection of the electrically conductive surface to a charge sink. FIG. 3 illustrates a conduit 30 of the present invention wherein a portion of the bore has an electrically conductive surface for carrying away charge and reducing charging effects. Velocity altering means 24 and 26 have been omitted for clarity of presentation. The conduit 30 is formed by a dielectric capillary and has two sections, 32 and 33, the walls of which define lengthwise bores 34 and 35, respectively. The capillary sections are joined end-to-end with the axes of the aligned bores, so that together they define a straight bore of substantially uniform diameter having an inlet 37 and an exit 39. An inlet end 36 of capillary section 32 is provided with an inlet end electrode 40, and an exit end 38 of capillary section 33 is provided with an exit end electrode 42. Where the other ends, respectively 46, 48, of capillary sections 32 and 33 join, an additional electrode 44 is provided. The surface of the bore 34 of the conduit is provided with an electrically conductive coating 45 as is known in the art. The bore surface coating is formed in electrically conductive contact with electrode 44. As the stalling ions impact the electrically conductive bore surface 45 near the additional electrode 44, the charges are carried away from the bore surface by way of the electrode 44.

The apparatus of the invention can be employed with any of a variety of ionization techniques, including atmospheric pressure ionization techniques such as electrospray ionization, plasma ionization, and atmospheric pressure chemical ionization. The apparatus can be employed with any of a variety of mass analytical techniques, including, for example, magnetic sector, quadrupole (and other multipole), ion trap, time-of-flight, and Fourier-transform (ion cyclotron resonance) techniques, and tandem MS/MS techniques.

It is to be understood that while the invention has been described in conjunction with the preferred specific embodiments thereof, that the foregoing description is intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

What is claimed is:

1. A method for selectively delivering ions to a vacuum region comprising the steps of:

(a) providing a dielectric conduit having an axial bore originating in an inlet opening contained within an ion source and terminating in an exit opening within the vacuum region;

(b) flowing a gas stream through the conduit, said gas stream comprising an ion traveling at a drift velocity through the bore from the inlet opening toward the exit opening;

(c) generating an electric field, corresponding to the polarity of the ion and generally opposing gas flow assisted movement of the ion within the conduit; and (d) selectively altering the temperature of the dielectric conduit for selectively altering the drift velocity of the ion, wherein the ion is selectively delivered to the vacuum region.

2. The method of claim 1, wherein the ion source is at about atmospheric pressure.

3. The method of claim 1, wherein the conduit is a capillary.

4. The method of claim 1, wherein the electric field is produced by applying to the conduit a potential difference of absolute magnitude in the range from about 0 V to about 20 kV.

5. The method of claim 1, wherein step (d) comprises heating a portion of the dielectric conduit such that heat is transferred to the gas stream.

6. The method of claim 1, wherein step (d) comprises changing the temperature of the gas stream before entry into the conduit.

7. The method of claim 1, wherein step (d) comprises cooling a portion of the dielectric conduit such that heat is removed from the gas stream.

8. The method as recited in claim 1, wherein the electromagnetic radiation has an infrared wavelength.

9. The method as recited in claim 1, wherein the electromagnetic radiation has a microwave wavelength.

10. A method for selectively delivering ions to a vacuum region comprising the steps of:

(a) providing a dielectric conduit having an axial bore originating in an inlet opening contained within an ion source and terminating in an exit opening within the vacuum region;

(b) flowing a gas stream through the conduit, said gas stream comprising an ion traveling at a drift velocity through the bore from the inlet opening toward the exit opening; and (c) selectively altering the temperature of the dielectric conduit for selectively altering the drift velocity of the ion, wherein the ion is selectively delivered to the vacuum region.

11. A method for selectively delivering ions to a mass analyzer operating in a vacuum region comprising the steps of:

(a) providing a dielectric conduit having an axial bore originating in an inlet opening contained within an ion source and terminating in an exit opening within the vacuum region containing the mass analyzer;

(b) flowing a gas stream through the conduit, said gas stream comprising an ion traveling at a drift velocity through the bore from the inlet opening toward the exit opening;

(c) generating an electric field, corresponding to the polarity of the ion and generally opposing gas flow assisted movement of the ion within the conduit;

(d) selectively altering the temperature of the dielectric conduit for selectively altering the drift velocity of the ion, wherein the ion selectively exits the conduit into the vacuum region; and (e) delivering the selected ion to the mass analyzer.

12. The method of claim 11, wherein step (d) comprises heating a portion of the dielectric conduit such that heat is transferred to the gas stream.

13. The method of claim 11, wherein step (d) comprises changing the temperature of the gas stream before entry into the conduit.

14. The method of claim 11, wherein step (d) comprises cooling a portion of the dielectric conduit such that heat is removed from the gas stream.

15. A method for selectively delivering ions to a mass analyzer operating in a vacuum region comprising the steps of:

(a) providing a dielectric conduit having an axial bore originating in an inlet opening contained within an ion source and terminating in an exit opening within the vacuum region containing the mass analyzer;

(b) flowing a gas stream through the conduit, said gas stream comprising an ion traveling at a drift velocity through the bore from the inlet opening toward the exit opening;

(c) selectively altering the temperature of the dielectric conduit for selectively altering the drift velocity of the ion, wherein the ion selectively exits the conduit into the vacuum region; and (d) delivering the selected ion to the mass analyzer.

16. An apparatus for selectively delivering ions from an ion source to a vacuum region, comprising:

(a) a dielectric conduit having an axial bore connecting the ion source and the vacuum region, wherein the gas flows from the ion source to the vacuum region at a drift velocity; and (b) thermal velocity altering means in a contact with the dielectric conduit for selectively altering the temperature of the conduit for altering the drift velocity of the ions, wherein the ions are selectively delivered to the vacuum region.

17. The apparatus of claim 16 wherein the ionization source is at about atmospheric pressure.

18. The apparatus of claim 16, wherein the velocity altering means comprises a means for heating the dielectric conduit.

19. The apparatus of claim 16, wherein the velocity altering means comprises a means for cooling the dielectric conduit.

20. An apparatus for selectively delivering ions from an ion source to a vacuum region, comprising:

(a) a dielectric conduit having an axial bore connecting the ion source and the vacuum region, wherein the gas flows from the ion source to the vacuum region at a drift velocity; and (b) electric velocity altering means in contact with the dielectric conduit for altering the drift velocity of the ion in a manner that does not substantially depend on the polarity of the ion, wherein the ion is selectively delivered to the vacuum region.

21. An apparatus for selectively delivering ions from an ion source to a vacuum region, comprising:

(a) a dielectric conduit having an axial bore connecting the ion source and the vacuum region, wherein the gas flows from the ion source to the vacuum region at a drift velocity; and (b) electric velocity altering means in contact with the dielectric conduit for altering the drift velocity of the ion in a manner that does not substantially depend on the polarity of the ion, said electric velocity altering means comprising a periodic, alternating direction electric field applied to the ion to effect trapping of the ion within the conduit, wherein the ion is selectively delivered to the vacuum region.

22. The apparatus of claim 21, wherein the periodic, alternating direction electric field varies at a radio frequency.

23. The apparatus of claim 21, wherein the electric velocity altering means further comprises at least two alternating voltage electrodes for producing the electric field, each encircling the conduit, and an alternating voltage supply electrically connected to the electrodes.

24. The apparatus of claim 23, wherein the alternating voltage supply can provide a range of alternating voltage frequencies.

25. The apparatus of claim 23, wherein the alternating voltage supply can provide a range of alternating voltage amplitudes.

26. The apparatus of claim 23, wherein the alternating voltage supply can provide alternating pulsed voltages.

27. A method for selectively delivering ions to a vacuum region comprising the steps of:

(a) providing a dielectric conduit having an axial bore originating in an inlet opening contained within an ion source and terminating in an exit opening within the vacuum region;

(b) flowing a gas stream through the conduit, said gas stream comprising an ion traveling at a drift velocity through the bore from the inlet opening toward the exit opening;

(c) generating an electric field, corresponding to the polarity of the ion and generally opposing gas flow assisted movement of the ion within the conduit; and (d) subjecting the gas stream to electromagnetic radiation having a wavelength that can be absorbed by the gas stream for raising the temperature of the gas stream and selectively altering the drift velocity of the ion, wherein the ion is selectively delivered to the vacuum region.

28. An apparatus for selectively delivering ions from an ion source to vacuum region comprising:

(a) a dielectric conduit having an axial bore connecting the ion source and the vacuum region, wherein the gas flows from the ion source to the vacuum region at a drift velocity; and (b) apparatus for selectively heating the gas stream electromagnetic radiation having a wavelength that can be absorbed by the gas stream for selectively altering the drift velocity of the ion, wherein the ion is selectively delivered to the vacuum region.

29. The apparatus as recited in claim 28, wherein the electromagnetic radiation has an infrared wavelength.

30. The apparatus as recited in claim 28, wherein the electromagnetic radiation has a microwave wavelength.

* * * * *